United States Patent [19]

Brehm et al.

[11] Patent Number: 5,274,724
[45] Date of Patent: Dec. 28, 1993

[54] METHOD OF SPLICING TWO OPTICAL FIBER CABLES

[75] Inventors: Claude Brehm, Montrouge; Jean-Pierre Dumas, Villemoisson Sur Orge; André Tardy, Egly; Dominique Brouard, Paris, all of France

[73] Assignee: Alcatel N.V., Amsterdam, Netherlands

[21] Appl. No.: 850,931

[22] Filed: Mar. 13, 1992

[30] Foreign Application Priority Data

Mar. 18, 1991 [FR] France .................. 91 03259

[51] Int. Cl.$^5$ .................................. G02B 6/38
[52] U.S. Cl. ............................ 385/95; 385/98
[58] Field of Search .................. 385/95, 97, 98, 99

[56] References Cited

U.S. PATENT DOCUMENTS

| | | | |
|---|---|---|---|
| 3,871,935 | 3/1975 | Gloge et al. | 385/98 X |
| 4,028,162 | 6/1977 | Cherin et al. | 385/98 X |
| 5,016,972 | 5/1991 | Schlaak | 385/95 X |

FOREIGN PATENT DOCUMENTS 0241724 10/1987 European Pat. Off. .

OTHER PUBLICATIONS

Patent Abstracts of Japan, vol. 2, No. 150, Dec. 15, 1978 JP-A-53-119-059 (Furukawa Denki) Oct. 18, 1978, p. 9651.

Primary Examiner—John D. Lee
Assistant Examiner—Stephen W. Barns
Attorney, Agent, or Firm—Sughrue, Mion, Zinn, Macpeak & Seas

[57] ABSTRACT

A method of splicing two optical fiber cables uses a glass multi-ferrule having a series of parallel axis internal capillary channels opening onto respective end surfaces of the multi-ferrule and two exterior reference surfaces. An adhesive that is polymerized by ultraviolet light is introduced into these channels. The multi-ferrule is cut into three sections. The splicing is achieved by jointing the outermost two sections.

6 Claims, 3 Drawing Sheets

METHOD OF SPLICING TWO OPTICAL FIBER CABLES

BACKGROUND OF THE INVENTION

1. Field of the invention

The present invention concerns a method of splicing two optical fiber cables.

It applies particularly, but not exclusively, to two ribbon cables each comprising a plurality of monomode fibers.

Such multifiber cables are intended for use in future multiservice optical networks. The jointing of such cables raises problems of cost, optical quality and ease of execution.

Jointing two optical fibers entails dimensional tolerances in the order of one micrometer because of the high degree of confinement of the optical energy. The simultaneous jointing of several pairs of fibers obviously accentuates the difficulty, all the more so in that economic objectives require a low-cost connection device to be used by relatively unskilled personnel under difficult operating and environmental conditions, in particular in trenches.

2. Description of the prior art

At present an operative places the ends of the fibers of each cable in channels etched into one surface of a silicon primary plate; a complementary plate is used to immobilize the fibers. The correct alignment of the two cables requires the use of complex and costly guide means. Guide means are described, for example, in the Pat. No. US-A-3 864 018 or the article by P. STEINMAN in "Fiber and Integrated Optics" vol. 9 pp. 43–52. The primary plates have projections on their outer surfaces cooperating with etched grooves in silicon secondary plates between which the ends of the two cables are sandwiched. These techniques impose severe tolerances on the thickness of the primary plates, the width and the angle of the secondary plate grooves and the spacing between these grooves The ends of each cable must be optically polished by a time-consuming and delicate operation. All aspects of the method are difficult and costly.

An object of the present invention is to enable the process of jointing two optical fiber cables to be considerably simplified.

SUMMARY OF THE INVENTION

The present invention consists in a method of splicing two optical fiber cables using a glass multi-ferrule having a series of parallel axis internal capillary channels opening onto respective end surfaces of said multi-ferrule and two exterior reference surfaces, in which method:

adhesive is introduced into said channels, the stripped ends of the fibers of the two cables are inserted into respective channels through said end surfaces until they substantially reach the central part of said multi-ferrule where they are immobilized, said multi-ferrule and said fibers are cut transversely to said fibers in two areas to either side of said central part to obtain two multi-ferrule sections fastened to respective cables and an intermediate multi-ferrule section which is discarded, and said two multi-ferrule sections are aligned in a splicing body comprising guide means for their respective common reference surfaces and, before they are brought into contact, a refractive index matching gel is injected into said body at the interfaces of said fibers.

A method in accordance with the invention therefore utilizes two multi-ferrule sections obtained from a common original multi-ferrule and initially situated very close to each other within the original multi-ferrule, at a distance of around 10 mm, for example. Consequently the two sections have intrinsically the same geometrical characteristics in respect of their internal channels and their external reference surfaces; any differences are within tolerances enabling very good optical coupling to be achieved.

In one specific embodiment, the cutting of said multi-ferrule into sections is facilitated by weakened areas transverse to said channels.

Thus when said channels are in a common plane inside the multi-ferrule two parallel grooves orthogonal to said plane open into said channels. It is also possible to provide two further grooves in the opposite surface of said multi-ferrule in line with the previously mentioned grooves. These additional grooves may have an asymmetric V-shape cross-section, for example.

End surfaces of said multi-ferrule advantageously include bearing surfaces for the insulative material jackets of said cables.

Moreover, the ends of said channels are preferably chamfered to facilitate insertion of the fibers.

In one specific embodiment, the cut cross-section of the fibers is oblique to the axis of said channels to reduce retroreflected light.

Other features and advantages of the invention will emerge from the following description of embodiments thereof given by way of non-limiting illustrative example only with reference to the appended highly diagrammatic drawings.

DETAILED DESCRIPTION OF THE INVENTION

Figure 1:
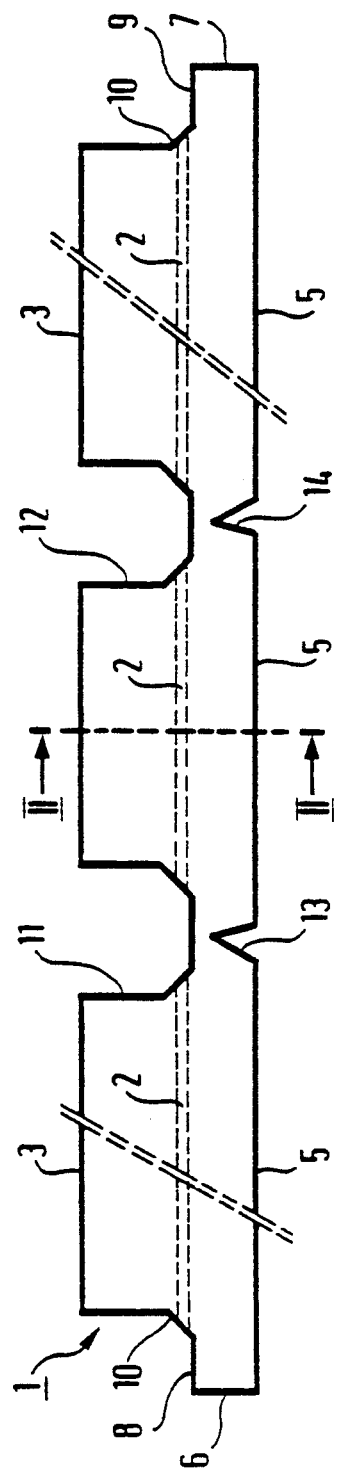
FIG. 1 is a view in elevation of a multi-ferrule used in a method in accordance with the invention.
Figure 2:
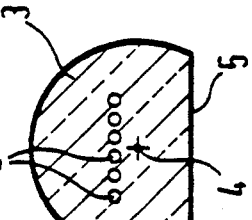
FIG. 2 is a view in cross-section on the line II—II in FIG. 1.
Figure 3:
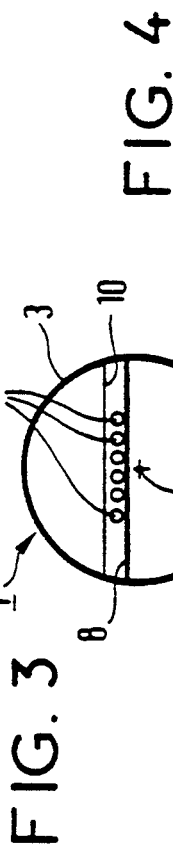
FIG. 3 is an end view of the multi-ferrule from FIG. 1.

FIGS. 1 through 3 show a silica glass multi-ferrule comprising internally a series of capillary channels 2 with parallel axes which (in this example) are coplanar.

A multi-ferrule of this kind is the subject matter of French Pat. No. FR-A-9013857.

Externally it has a cylindrical surface 3 with an axis 4 and a diameter of 3 mm and a plane surface 5 approximately 2.5 mm wide. The surfaces 3 and 5 will be referred to hereinafter as "reference surfaces". The length of the multi-ferrule is 30 mm.

The plane containing the channels 2 is near the diametral plane of the cylinder and parallel to the surface 5. Assume six equidistant channels 2 with a spacing of 250 μm matching the number and location of the fibers in the cables 21 and 22 to be jointed, which can be seen in FIG. 4.

The end surfaces 6 and 7 are machined to provide bearing surfaces 8, 9 for the cables to be jointed. The surfaces 8, 9 are at a distance of 125 μm (with a tolerance of −0, +25 μm) from the common diametral plane of the channels 2. The entries of the channels 2 are provided with chamfers 10 to facilitate the insertion of the fibers. A machined oblique surface is provided at the entry of the channels 2 for the same reason.

The multi-ferrule 1 also has transversely machined weakened areas to facilitate dividing it into sections at a later stage.

These areas comprise two grooves 11 and 12 each 2 mm wide with a distance between their central axes of 8 mm. These grooves are orthogonal to the plane of the channels 2 and their bottoms intersect the channels 2.

Chamfers 10 are preferably formed at the bottom of the grooves, again to facilitate the entry of the fibers into their channels.

A tolerance with respect to the height of the grooves 11 and 12 of ±25 μm would be acceptable relative to the nominal dimension, which would be that of the common diametral plane of the channels 2. Additional asymmetric V-shape grooves 13 and 14 are machined into the surface 5 in line with the grooves 11 and 12.

A low-viscosity adhesive 25 polymerized by ultraviolet light may be introduced into the channels 2 of the multi-ferrule 1 as just described which can then be packaged in an opaque plastics material tube for subsequent use. The dimensional stability of the component is guaranteed by the fact that the multi-ferrule is made from silica glass which has a very low coefficient of thermal expansion.

Figure 4:
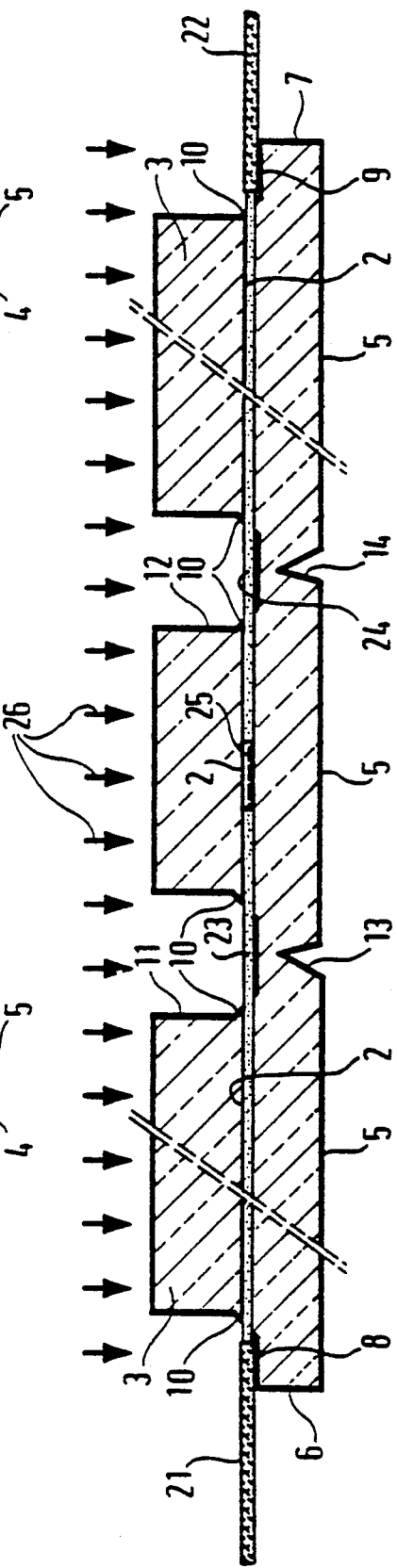
FIG. 4 .shows the phase of bonding the fibers of two cables info the multi-ferrule from FIG. 1.

The various phases of a splicing method in accordance with the invention will be described hereinafter with reference to the jointing of ribbon cables 21 and 22 of which only a single fiber 23, 24 can be seen in FIG. 4.

The two cables 21 and 22 are first stripped to remove the protective plastics material coating from the fibers 23, 24 over a given length with a wide tolerance of ±1 mm. No conditions are imposed as to the quality of the fiber ends; even jagged ends can be tolerated.

The prepared ends of the fibers 23, 34 are collectively inserted into the channels 2 of the multi-ferrule 1 containing the adhesive 25 which can be polymerized by ultraviolet light. This operation is facilitated by the chamfers 10 and because the spacing of the fibers is the same in the cable and in the channels.

The fibers are inserted until the plastics material coating of the cables 21, 22 bears against the surfaces 8 and 9, the stripped length of the fibers 23, 24 being such that the fiber ends reach the central part of the multi-ferrule 1. A deposit of adhesive on the surfaces 8 and 9 fastens the cables 21 and 22 to the multi-ferrule and exposure to ultraviolet light (schematically represented by the arrows 26) bonds the fibers.

Figure 5:
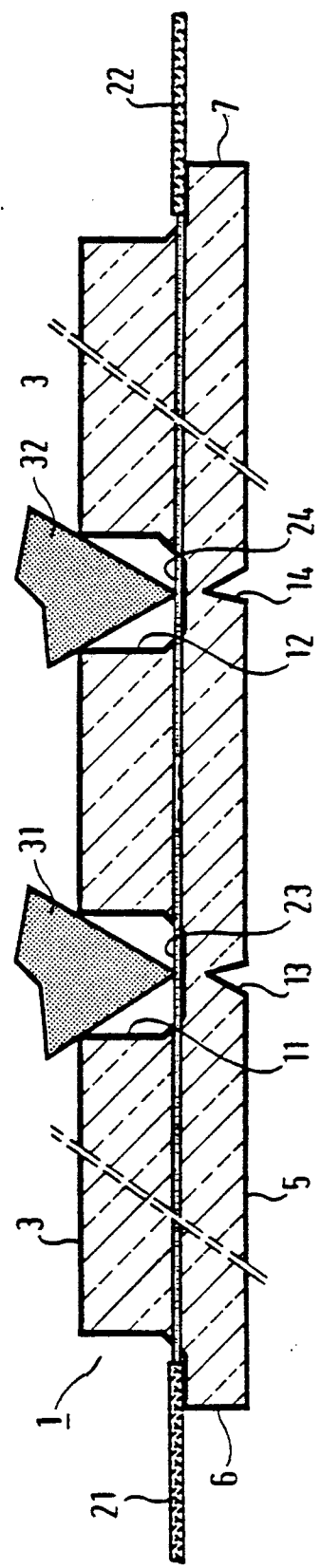
FIGS. 5 and 6 how the cutting into sections of the multi-ferrule from FIG. 1.

The multi-ferrule 1 and the two cables 21, 22 are immobilized in a jig. Two diamond-coated cutters 31 and 32 with prism-shape cutting edges (with an included angle of 60°, for example) are then used (FIG. 5) to score the surfaces of the fibers 23, 24 in the grooves 11 and 12 to create weakened areas. These cutters are suspended vertically with a return spring and movable transversely.

Figure 6:
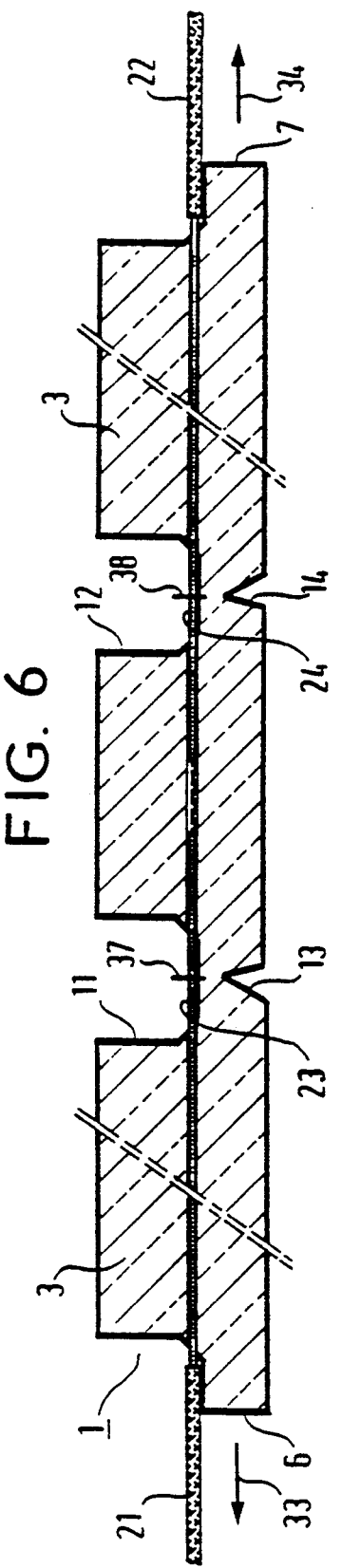

As shown in FIG. 6, lateral traction means schematically indicated by the arrows 33 and 34 apply tension to the multi-ferrule 1 to initiate rupture at the scored areas 37, 38 associated with the V-shape notches 13, 14.

Figure 7:
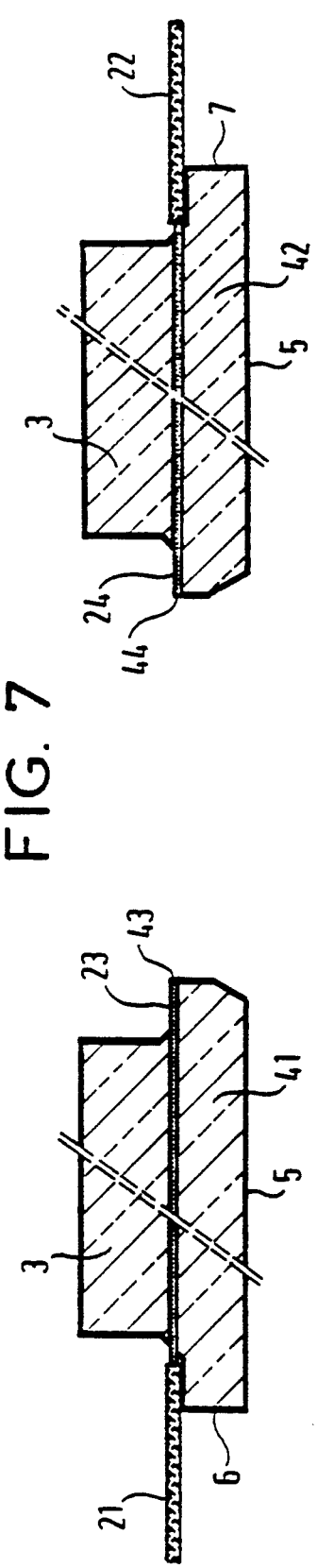
FIG. 7 shows the two multi-ferrule sections joined to their respective cables and separated from the intermediate section.

This produces two multi-ferrule sections 41 and 42 joined to the respective ribbon cables 21, 22 (FIG. 7); the end faces 43, 44 of the fibers 23, 24 are of the optical quality required for optical coupling. Depending on the cutters 31, 32 employed, the faces 43, 44 may be at right angles or oblique to the axes of the channels 2.

According to the invention the two multi-ferrule sections 41, 42 have external reference surfaces 3 and 5 originating in very closely adjacent areas of a common original multi-ferrule 1. Prior art techniques are available which can achieve multi-ferrules whose external dimensions over longitudinal distances of a few centimeters are sufficiently invariant, as is the parallel relationship between the axes of the channels 2 and the axis 4, for satisfactory optical alignment to be achieved, as shown in the FIGS. 8 and 9 diagrams:

The tolerances on the channel diameter are: −0, =1 μm.

The spread of channel axis position relative to the optimum plane passing as close as possible to each axis must be within ±10 μm.

The spread of channel axis spacing in the direction of the aforementioned optimum plane is within ±10 μm.

Figure 8:
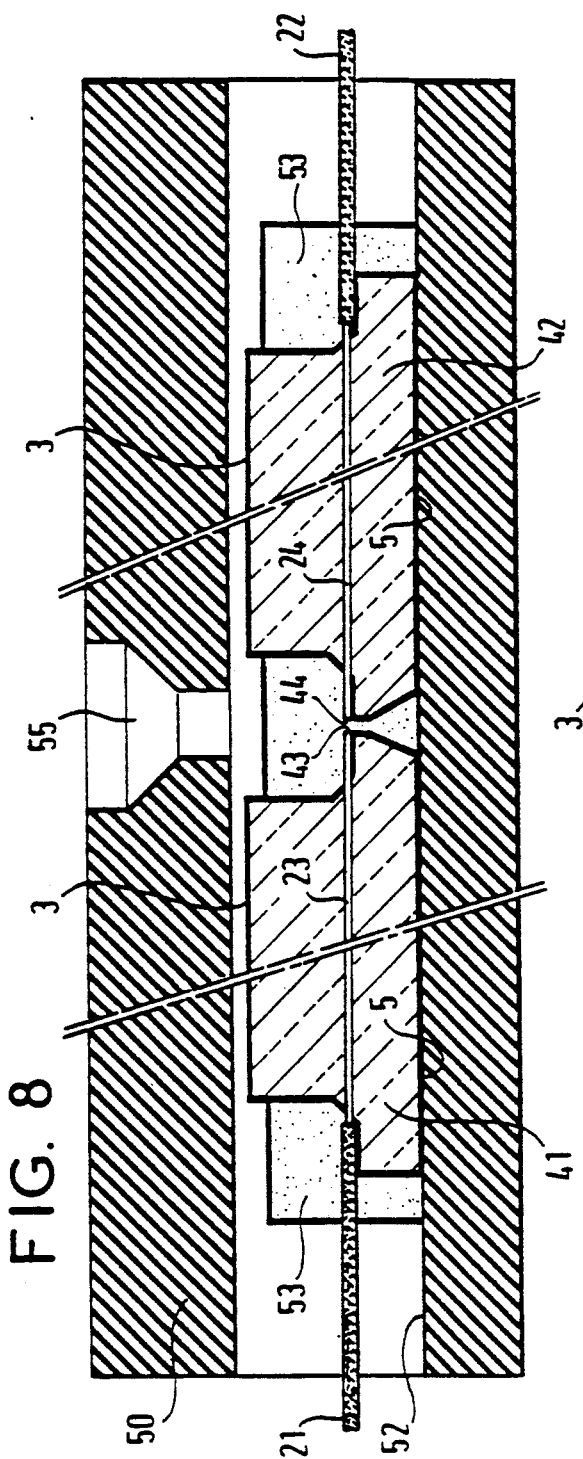
FIG. 8 shows the two sections from FIG. 7 brought together splicing body.
Figure 9:
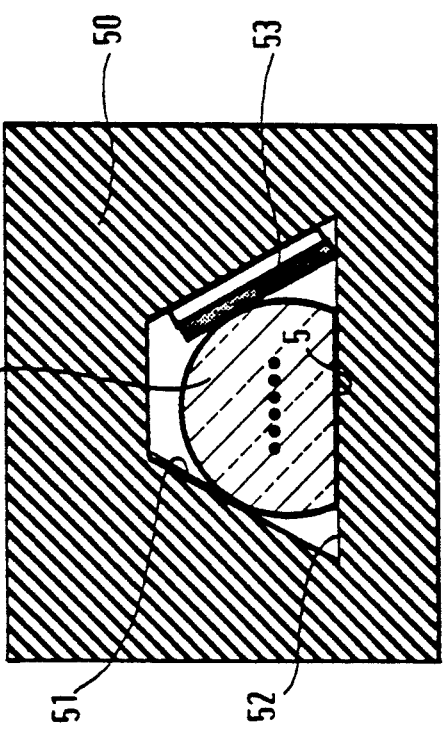
FIG. 9 is an end view of the body from FIG. 8.

FIGS. 8 and 9 show a splicing body 50 which aligns and mechanically fixes the two sections 41 and 42.

The reference surfaces 3 and 5 are pressed against surfaces 51 and 52 of the splicing body by an elastically deformable leaf spring 53. Before the sections 41 and 42 are brought into contact a refractive index matching gel is inserted through an orifice 55 into the gap between the interfaces 43, 44.

The invention is of course not limited to the embodiment that has just been described. Any means described herein may be replaced with equivalent means without departing from the scope of the invention.

There is claimed:

1. Method of splicing two optical fiber cables using a unitary glass multi-ferrule having a coplanar series of parallel axis internal capillary channels opening onto respective end surfaces of said multi-ferrule and two exterior reference surfaces, and wherein said multi-ferrule includes two parallel grooves provided orthogonal to the plane of said channels and intersecting said channels, said method comprising:

introducing adhesive into said channels, inserting stripped ends of the fibers of the two cables into respective channels through said end surfaces until they substantially reach a central part of said multi-ferrule where they are immobilized, cutting exposed portions of the stripped ends of the fibers at said two parallel grooves and cutting said multi-ferrule into sections delineated by said two parallel grooves transversely to the axis of the fibers to either side of said central part to obtain two multi-ferrule sections fastened to respective cables and an intermediate multi-ferrule section which is discarded, and aligning said two multi-ferrule sections in a splicing body comprising guide means for respective common reference surfaces of said multi-ferrule sections and, before said multi-ferrule sections are brought into contact at said respective common reference surfaces, injecting a refractive index matching gel into said body at the interfaces of said fibers.

2. Method according to claim 1 wherein additional grooves are provided on the opposite side of said multi-ferrule from said parallel grooves and in line with said parallel grooves to provide weakened areas facilitating the cutting of said multi-ferrule into said sections.

3. Method according to claim 2 wherein said additional grooves have an asymmetric V-shape.

4. Method according to claim 1 wherein end surfaces of said multi-ferrule include bearing surfaces for insulative material jackets of said cables.

5. Method according to claim 1 wherein the ends of said channels are chamfered to facilitate insertion of said fibers.

6. Method according to claim 1 wherein said fibers are cut in such a way that the cut cross-section of the fibers is oblique to the axis of said channels.

* * * * *